(12) United States Patent
Daly (10) Patent No.: US 7,604,988 B2
(45) Date of Patent: *Oct. 20, 2009

(54) CLOSED LOOP WORK STATION BIOREMEDIATION USING MINI-REACTOR CARTRIDGES

(76) Inventor: Lewis J. Daly, 5890 Pierson Rd., Fayetteville, NY (US) 13066

( * ) Notice: Subject to any disclaimer, the term of this patent is extended or adjusted under 35 U.S.C. 154(b) by 830 days.

This patent is subject to a terminal disclaimer.

(21) Appl. No.: 11/181,431

(22) Filed: Jul. 14, 2005

(65) Prior Publication Data

US 2005/0250201 A1   Nov. 10, 2005

Related U.S. Application Data

(63) Continuation-in-part of application No. 10/172,181, filed on Jun. 14, 2002, now Pat. No. 6,924,140.

(51) Int. Cl.
*B01D 53/84* (2006.01)
(52) U.S. Cl. .................. 435/299.1; 435/266; 435/300.1
(58) Field of Classification Search ............... 435/299.1, 435/266, 300.1
See application file for complete search history.

(56) References Cited

U.S. PATENT DOCUMENTS

| | | | |
|---|---|---|---|
| 1,848,576 A | | 3/1932 | Sandel |
| 2,711,683 A | * | 6/1955 | Ryder ............................ 454/8 |
| 3,880,061 A | | 4/1975 | Hensiek et al. |
| 3,936,281 A | | 2/1976 | Kurmeier |
| 4,421,534 A | | 12/1983 | Walker |
| 4,734,111 A | | 3/1988 | Hoffmann et al. |
| 4,961,763 A | | 10/1990 | Thompson et al. |
| 5,089,036 A | | 2/1992 | Hawes |
| 5,322,621 A | | 6/1994 | Fan et al. |
| 5,407,470 A | | 4/1995 | Jutzi |
| 5,409,834 A | | 4/1995 | Birdwell |
| 5,691,192 A | | 11/1997 | Cox et al. |
| 5,869,323 A | | 2/1999 | Horn |
| 6,010,900 A | | 1/2000 | Cherry |
| 6,019,810 A | | 2/2000 | Phillips et al. |
| 6,924,140 B2 | * | 8/2005 | Daly ....................... 435/299.1 |
| 2001/0053546 A1 | * | 12/2001 | Stewart et al. ........... 435/290.1 |
| 2002/0155593 A1 | * | 10/2002 | Hongo .................... 435/289.1 |

FOREIGN PATENT DOCUMENTS

| | | |
|---|---|---|
| DE | 4331932 | 3/1994 |
| DE | 20202722 U1 * | 5/2002 |

* cited by examiner

*Primary Examiner*—William H Beisner
(74) *Attorney, Agent, or Firm*—Marjama Muldoon Blasiak & Sullivan LLP (57) ABSTRACT

A system for capturing and neutralizing HAP's (hazardous air pollutants) and VOC's (volatile organic compounds) at the source point by providing a closed loop remediation system which utilizes an air collection, treatment and control module containing a predetermined size bay of multiple interchangeable mini-biofilter cartridges that function to consume the pollutant and recirculate remediated air back to the source point of the pollutant. The system includes establishing a closed loop air system at a work station which generates and emits VOC's, capturing the VOC's in the air stream flow and transporting them directly into an adjacent biofilter module which contains selected microorganisms in mini-cartridges which biodegrade said VOC's and recirculates remediated air back to the source point of the pollutant. The cartridges may be contained in modules in single and/or multiple widths and heights and in conjunction with various work stations, cabinets, receptacles, and tables.

22 Claims, 7 Drawing Sheets

CLOSED LOOP WORK STATION BIOREMEDIATION USING MINI-REACTOR CARTRIDGES

CROSS REFERENCE TO RELATED APPLICATION

This is a continuation-in-part of U.S. Ser. No. 10/172,181, filed Jun. 14, 2002, now U.S. Pat. No. 6,924,140 the entirety of the above application is incorporated herein by reference.

BACKGROUND OF THE INVENTION

The present invention relates in general to a system for removal and treatment of pollutants in air, and more specifically to a source point closed loop remediation system. With respect to HAP (hazardous air pollutants) and VOC (volatile organic compounds) current methods of VOC removal include distillation; oxidation combustion ionization; biofiltration; and activated carbon adsorption. All of these methods are large whole-building fixed systems having high installation costs, and, with the exception of biofiltration, have high energy consumption and introduce new pollution considerations or generate hazardous waste.

The present invention includes the use of multiple small mini-reactor cartridges to reduce installation and repair or replacement and maintenance costs, permit incremental system expansion, and allow a variety of suitable mini-reactor based remediation technologies to be used together in series or parallel.

Present systems typically treat and exhaust an entire volume of building air without considering the actual pollution source and concentration, resulting in inefficient pollution removal. Furthermore, air heating or cooling of the makeup building air is required which adds to total energy consumed.

Biofiltration utilizes the natural process of biodegradation which in its most basic form occurs in a compost pile. Most typically, water-borne microbes consume the carbon in the organic matter of the pile, and release carbon dioxide and water. By passing an airstream containing an organic vapor (HAP/VOC) containing carbons through such a compost pile, the microbes will preferentially consume the more readily available carbon in the gas stream, thereby cleansing said airstream.

Notwithstanding initial installation costs, biofiltration is a proven and low energy cost, natural method of HAP/VOC remediation that has been in commercial use in large installations both in the United States and abroad for over 15 years. In biofiltration, no secondary carbon source (natural gas) is required to maintain combustion and make up for varying concentrations of VOC laden air as in the most widely employed oxidation process; and no hazardous waste is generated as with carbon absorption; and no by-products other than water and carbon dioxide are released. Distillation is usually not economically practical due to relatively low work place concentrations and value of the recovered chemical.

Because of their large size and method of construction and operation, current bioremediation systems have relatively high installation, secondary energy consumption and operational costs approaching the other methods.

Current biofiltration technology includes the use of naturally biodegradable media such as compost and vegetation as the supporting media and the source of both microbes and nutrients, and has proven to have inconsistent and relatively uncontrollable and repeatable long term field performance.

The present invention includes complete control of the microbial environment with the use of stable artificial media in conjunction with controlled water and nutrient addition for consistent operation. The present invention further includes the inoculation of said environment with specifically isolated and custom grown inoculate tailored to the VOC/HAP to be remediated to maintain high and consistent removal efficiency.

With respect to bioremediation, the following prior art is representative of the state of the art with respect to treating HAP's and VOC's.

U.S. Pat. No. 3,880,061 broadly relates to a contamination free work station by providing an air stream across the work station to remove any contaminants through filter means as shown in the figure.

U.S. Pat. No. 4,734,111 is directed to a process and apparatus for cleaning spent air or air polluted with styrene and filtering out the styrene in an apparatus and process which uses a specific biofilter utilizing a spruce bark and microorganisms thereon to degrade the styrene.

U.S. Pat. No. 5,409,834 relates to an invention and apparatus for removing pollutants from a source of polluted air such as a work paint station (see FIG. 1). Polluted air from the work station is introduced from a supply conduit into a wet plenum chamber which has a spray nozzle which sprays microbial laden liquid into the incoming polluted air.

U.S. Pat. No. 5,691,192 is related to a biological filter for removing volatile compounds from gas emissions such as styrene. The styrene is broken down with a fungus which is contained on a carrier or inert material such as perlite. Activated carbon may also be added to the mixture.

U.S. Pat. No. 5,869,323 is directed to a biofilter which uses a bioreactor treatment tank comprising at least one bioreactor bed and in which the air filtration is conducted such that the air flow through the tank is from the top downward, with the biofiltration being conducted under pressures of less than an ambient.

These inventions teach the conventional type of prior art systems which are used for aerobic bioremediation in commercial plants. All the above, and this patent pertain to aerobic biofiltration wherein the biodegradation occurs on the surface of a water film by a consortium of aerobic microbes.

U.S. Pat. No. 6,010,900 is directed to enhancing biodegradation using a bioreactor. The bioreactor contains an aqueous phase in which a microorganism capable of degrading a sparingly soluble volatile organic compound is contained. The patent further teaches contacting the solution with a gas/vapor stream comprising the sparingly soluble volatile organic compound such that the soluble volatile organic is solubilized in the aqueous phase to form an enriched solution, and then incubating the enriched solution so that the microorganism degrades the solubilized sparingly soluble volatile organic compound thereby enhancing biodegradation. (This is an anaerobic process and is not related to the present invention).

It can therefore be seen from the above cited commercial practices and prior art that there is a need for a bioremediation system which reduces natural gas and energy consumption and high fixed and operation costs of remediation; adds efficiency, control and repeatability to the bioremenation process; and does not produce hazardous waste by-products as is typical of the current prior art systems.

SUMMARY OF THE INVENTION

It is therefore an object of the present invention to provide a shippable by common carrier, expandable, movable, modular components, cartridge based closed loop system for remediation of HAP/VOC's within a manufacturing plant at the source.

It is another object of the present invention to provide an efficient biological system which reduces HAP/VOC's to water and carbon dioxide.

It is another object of the present invention to remediate process HAP/VOC's concentration over 90%.

It is yet another object of the present invention to provide a system for collection and neutralizing HAP's (hazardous air pollutants) and VOC's (volatile organic compounds) at the source point.

Another object is to contain the biological eco-system in multiple small biofilter cartridges.

Another object is to use an artificial support media for the water film that supplies no naturally biodegradable matter and therefore will not degrade or compact.

Another object is the use of specifically isolated inoculate containing highly efficient microbe strain(s) tailored to maximally consume the VOC/HAP to be remediated.

Another object is to provide appropriate nutrient addition to enhance microbial growth.

Another object is to provide and maintain a suitable water film to the media to sustain the inoculate eco-system.

Another object is to replenish the media water film by periodically and discontinuously bio-recirculating inoculate and nutrient laden water through the media at a low flow rate.

Another object is to flush excess biomass and cleanse and reactivate the media by periodically and discontinuously filtering and recirculating inoculate and nutrient laden water through the media at a high flow rate.

Another object is to collect, filter, store, replenish and recirculate the nutrient and inoculate laden water within a remediation system at the work station.

Another object is to allow reversal of the airstream flow through the reactor cartridges.

Another object is to contain air and water functions in remediation modules.

Another object is to allow top-to-bottom physical reversal of the reactor cartridge in the system.

Another object is to allow system reversal of the airstream direction through the cartridge.

Another object is to allow for series and/or parallel airflow through multiple cartridges.

Another object is to allow various cartridges to contain differing media, inoculate, and/or remediation methods.

Another object is to allow individual replacement of a single cartridge in a remediation system.

Another object is to use the mini-reactor cartridge embodiment for other granular remediation techniques.

Another object is to include exhaust stream dehumidification.

Another object is to combine all remediation system functions in a single cartridge assembly.

The present invention is directed to providing a closed loop modular remediation system which includes air collection with air and water treatment and control and contains a predetermined size bay of multiple interchangeable mini-biofilter cartridges that function to consume the pollutant and recirculate remediated air back to the source point of the pollutant.

In one embodiment, a closed loop air stream is established at a work station area involving fiberglass laminating which generates and emits the styrene HAP, which is captured by the air stream flow which transports the emitted styrene directly into an adjacent biofilter module system as described above which contains selected microorganisms in multiple mini-biofilter cartridges which consume the styrene, and recirculates the remediated air back to the source point of the pollutant at the work station. The air flow is continuous and the system serves to maintain the styrene level at the work station at safe levels.

In a further embodiment, multiple sources of contaminants in a given room or area can be captured and treated at a single remediation station or multiple remediation stations can be used within a given room or area to treat higher concentrations.

BRIEF DESCRIPTION OF THE DRAWINGS

For a further understanding of these and objects of the invention, reference will be made to the following detailed description of the invention which is to be read in connection with the accompanying drawing, wherein.

DETAILED DESCRIPTION OF THE INVENTION

Figure 1:
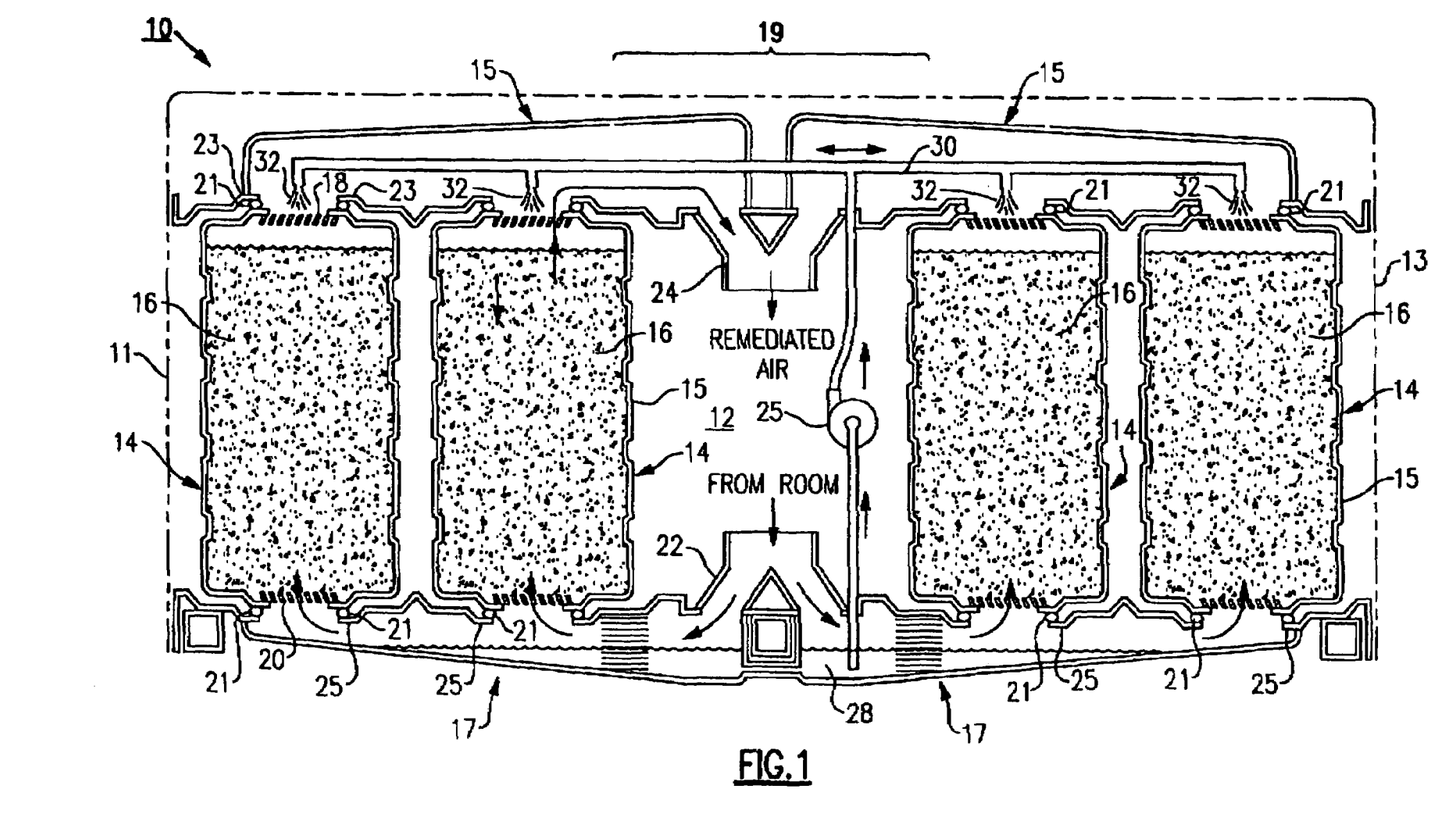
FIG. 1 is a front view with partial break away of a self-contained air collection, treatment and control module containing multiple biofilter cartridges used in the system of the present invention.

The present invention is more fully understood with reference to the drawings where FIG. 1 illustrates a closed loop system 10 for treating a work station area or module 12 which collects and remediates a source of pollutant such as styrene generated from laminating with fiberglass. The module contains end walls, 11 and 13 and connecting side walls (not shown), upper manifold 15 and lower manifold 17 and a centrally located control console 19, also described as a control housing assembly, (not shown) which functions to control the timing and sequencing of the various pumps and blower which control the water and air flow of the system. This hardware and electronics control the operation of the system and are conventional in the art. The upper and lower manifolds provide a support means to hold a plurality of cartridges 14 in place and allow them to be easily removed for replacement or repair. The upper manifold is mounted to and supported by end walls 11 and 13 and control console 19. As illustrated in FIG. 1, compressible seal members 21 function to hold the cartridges in place, with the seal means functioning to seal the top and bottom of the cartridge which fits between the upper and lower manifold structure at 23 and 25. It should be understood that any conventional support and sealing means available in the art may be used to seal and hold the interchangeable cartridges in place. For example, springs, hinges, a snap-fit geometry or any combination thereof may be used to hold the cartridges in place. Any conventional sealing means, such as O rings, cushioning foam, interlocking contact surfaces and the like, may also be used. The closed loop ducting system contains an array of interchangeable mini-biofilter cartridges 14 which contain a carrier medium 16 supporting a water film suitable for microorganisms or a mix of microorganisms on the carrier surface which have been selected to degrade the styrene or other VOC's of interest. The cartridge(s) is preferentially filled with a suitable inert carrier material such as perlite or an inert synthetic material such as plastic or a ceramic. A moisturized and nutrientized airflow through the biofilter promotes the growth of indigenous or synthesized microorganisms on the surface of the carrier material which through the action of the microorganisms acts to biodegrade the HAP and/or VOC's of interest. Suitable microorganisms which can be used to promote this degradation include bacteria, such as *Pseudomonas* and *Mycobacterium*. Other suitable natural occurring materials which contain indigenous microorganisms such as compost, peat, soil, wood chips, plant residues and tree bark may also be used or included. The reversible biofilters contain an outer housing or shell 15 suitability made of plastic and contain a perforated top and bottom, 18 and 20 respectively, which may include a screen to allow for air flow and water flow through the biofilter. Interconnecting ducting 22 passes a flow of contaminated air from the room through the bottom of the biofilters with remediated air passing back into the room through ducting 24. Pump 25 functions to recirculate and replenish the inoculated nutrient laden water film on the carrier material in the biofilters which enhances the action of the microorganisms in degrading the styrene. Pump 25 preferentially draws water from lower collection trough 28 which has received excess water from the biofilters 14. Pump 25 then recirculates the water to the top of the biofilter through water manifold 30 and nozzles 32. In FIG. 1, which is not drawn to scale, area or room 12 is depicted as grossly smaller in size than the closed loop system 10. For example the cartridges 14 are typically about 30 inches in height and 15 inches×15 inches in cross-section. The discrepancy in relative sizes is to better show the detail of the closed loop system.

Figure 2:
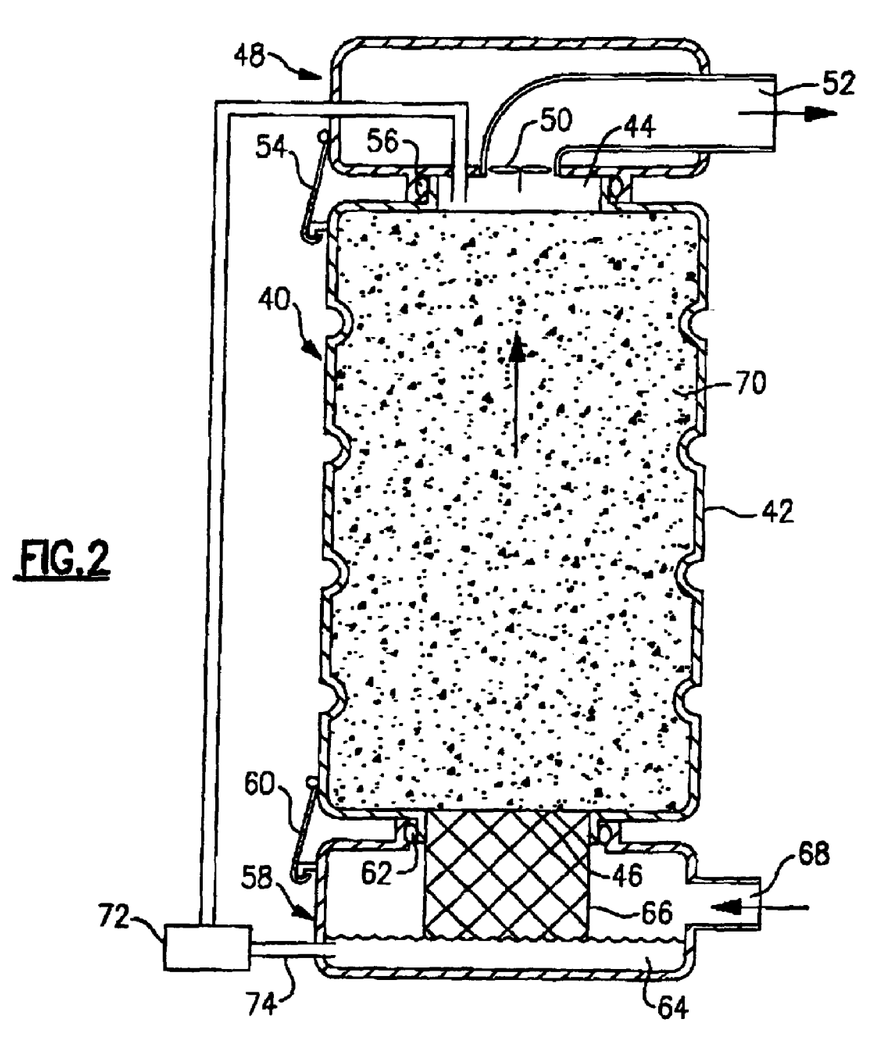
FIG. 2 is a schematic side view of a self-contained single cartridge remediating system for treating a small source.

In a further embodiment of the present invention as shown in FIG. 2, a single independent mini-reactor cartridge 40 is illustrated. The cartridge contains an outer housing 42 and is open at both ends 44 and 46 with supporting grilles (not shown) to contain the carrier media. The cartridge contains an upper clip-on blower housing 48 which contains an exhaust fan 50 and an exhaust port 52. The blower housing is attached to the cartridge by latch (spring) 54 and ring seal 56. A water reservoir 58 is attached to the bottom of cartridge 40 by latch (spring) 60 and ring seal 62. The reservoir contains water 64 and optionally a wicking humidifier filter 66. In operation, air to be treated is drawn in through inlet 68 and humidified in reservoir 58. A suitable source of microorganisms contained on a carrier media 70 in the housing degrade the VOC of interest as previously described herein. The arrows in the drawing depict the flow path with the remediated air passing through media 70 and exiting through exhaust port 52.

A water recirculation pump 72 and associated water transfer manifold 74 may optionally be added to recirculate the microbe and nutrient laden water from the reservoir 58 to the top of the reactor cartridge 40. Optionally dehumidification may be required to lower exit air moisture buildup.

A single cartridge system of the type shown in FIG. 2 was used for evaluation and testing. The mini-reactor cartridge measured 15" square and 30" tall with 8½" square inlet and outlet grilled openings at opposite ends. The nominal inside volume of the cartridge was approximately 3.6 cubic feet. The cartridge with a bottom grille installed, weighs approximately 16 pounds. The reactor was then loaded with 30 pounds of coarse perlite media, for a total cartridge plus media dry weight of about 46 pounds.

The blower housing as shown in FIG. 2 was attached to the top of the cartridge along with a water replenishment port and water recirculating hose, and a small water recirculating submergible pump was installed in the water reservoir. The system was assembled by placing the cartridge on top of the water reservoir and then adding the blower housing on top of the cartridge to make up a basic system as described in FIG. 2.

The system parameters were then adjusted to achieve a 5 CFM airflow giving a nominal 45 second empty bed dwell time. The water flow was set at a nominal flow of 8 oz./hr. to supply sufficient bed moisture in the range of 4 oz./hr. to account for evaporation due to a 40% RH ambient air, plus an additional 100% excess to maintain some trickling flow through the bed.

The system was then loaded with 2 gallons of inoculate and nutrient mixed in water. The inoculate used was *Pseudomonas Putida* which is capable of growth on toluene and is grown on a dilute minimal medium using styrene as a sole carbon and energy source. The inoculate is used in a concentration of about $10^8$ CFU/ml and introduced to the cartridge by trickling over the perlite. The nutrient used was a common slow release granular garden fertilizer sold by Agway under the trade name Osomocote.

A standard styrene source which releases 100 PPM styrene at 5 CFM was connected to the inlet port, and the system blower and pump were started up. Measurements were taken with a photo-ionization detector (PID) at the inlet and outlet of the system. Within 1 hour of startup, the average concentration in the outlet stream was 18 PPM, and after 24 hours had dropped under 9 PPM for a 90%+reduction in styrene concentration.

Earlier lab tests made on a similar size configuration set to the same airflow dwell time parameters, but using a horizontal lab reactor loaded with oak chips and natural compost, and with no water trickling or inoculate addition achieved a 75% removal rate after 7 days of operation, and maintained in that range for over 2 months until the test was terminated due to the bed drying out.

Another lab test using the same lab reactor and test setup and loaded with oak chips, and the inoculate, had faster startup results on the order of 4 days and better long term remediation on the order of 85%, until the natural bed settled and bed channeling occurred some time after 3 months. This was indicated by a decrease in remediation down to 80%. Disassembly of the reactor confirmed the channeling along with some bed dryup and compaction.

A further lab test using the same lab and test setup was loaded with plastic pellets and a water pump added to recirculate the water from the bottom of the reactor to the top. The *Pseudomonas Putida* inoculate described above was used with the addition of a slow release nutrient. Initial startup time was on the order of 2 days to reach a 80% removal rate, with 90% being reached after 4 days. The reactor efficiency continued to increase. Pump failure eventually occurred after another 10 days at which point the removal rate was up to 94%.

It should be understood that various component configurations and modifications my be used in the application of the system of the present invention. For example, modules in single and multiple widths and depths corresponding to the number of individual cartridges placed side-by-side and front-to-back may be employed. The modules as described herein are also called CAM's or "central air flow modules".

Stacked modules in various heights corresponding with the cartridge heights can also be employed along with modules in various widths and depths with associated top and bottom manifold assemblies, control housings, and end walls in various heights.

Lower manifold assemblies with an integral reservoir, water and air passages and seals for removable cartridges can be used to facilitate easy cartridge insertion and removal. These assemblies can be used in conjunction with an upper manifold assembly having an integral water and air passages and seals for the removable cartridges. A control housing assembly connecting lower reservoir and upper manifold assemblies may also be employed, along with end walls connecting the lower reservoir and upper manifold assembly.

Figure 3A:
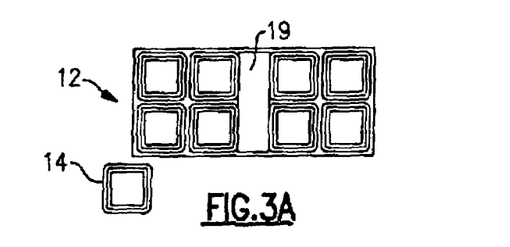
FIGS. 3A and 3B are top and side views respectively of multiple and removable cartridges of varying heights.
Figure 3B:
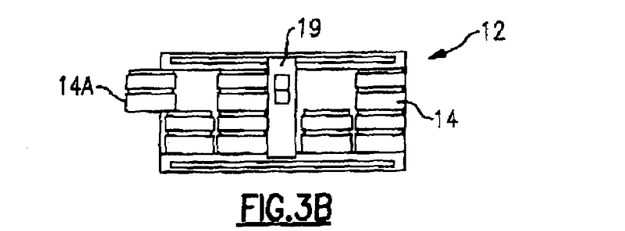

Multiple stacked and removable cartridges may be placed and contained within a module in various configurations such as 2-12" high cartridges and/or 1-24" high cartridge in the same height module. When stacked, removable inter-cartridge locating/sealing spacers may be employed along with reversible cartridges and end-to-end symmetry for inverting in module. FIGS. 3A and 3B illustrate this concept in 2-12" high cartridges 14A are used in a stacked configuration with 24" high cartridges 14 in the same height module 12.

From a process or system control standpoint, timed cartridge flushing with liquid from a reservoir may be used. Time recirculation of liquid within a reservoir may also be employed along with timed nutrient and buffer delivery into the reservoir liquid. Automatic filling of reservoir from a water source can be accomplished with a float valve or by other suitable means. Wicking humidification filters may optionally be used in the lower manifold assembly reservoir.

In use, multiple cartridge modules may be employed as production floor furniture, such as tables, walls, dividers, hooded tables, etc. Single and dual cartridge modules may also be used with production floor equipment such as scrap pails, drums, cabinets, drum enclosures, etc.

The collection or source capture equipment described above is employed to collect and/or contain the VOC released from a part operation, or cure cycle into a small or enclosed volume to limit the VOC from spreading throughout an entire area. VOC laden air from this volume is then passed through the CAM for remediation, and recirculated back to the source volume. The system any also be used to modify the ambient airflow and redirect it back towards a collection point on the equipment for re-introduction into the CAM for remediation, forming a closed loop between the VOC source and the VOC remediation equipment.

The following embodiments, along with their drawings which depict the respective embodiment, illustrate various applications of the system of the present invention.

Figure 4:
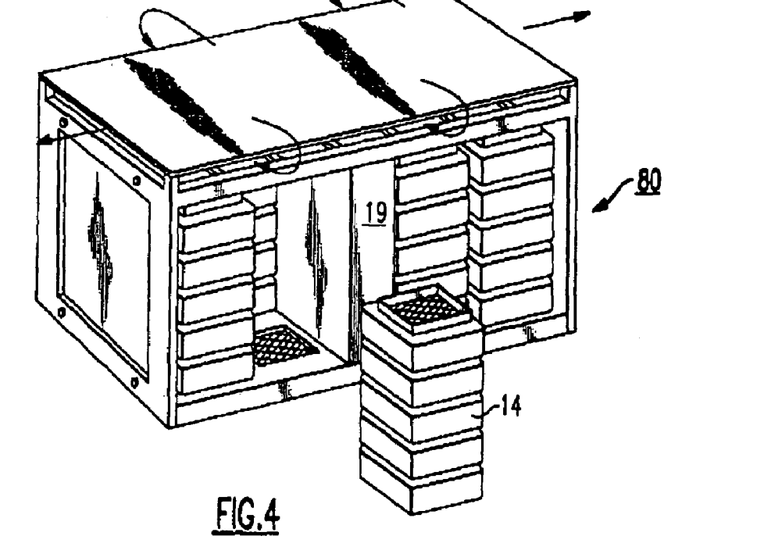
FIG. 4 is a perspective view of a work table illustrating air flow at the perimeter of the table.
Figure 5:
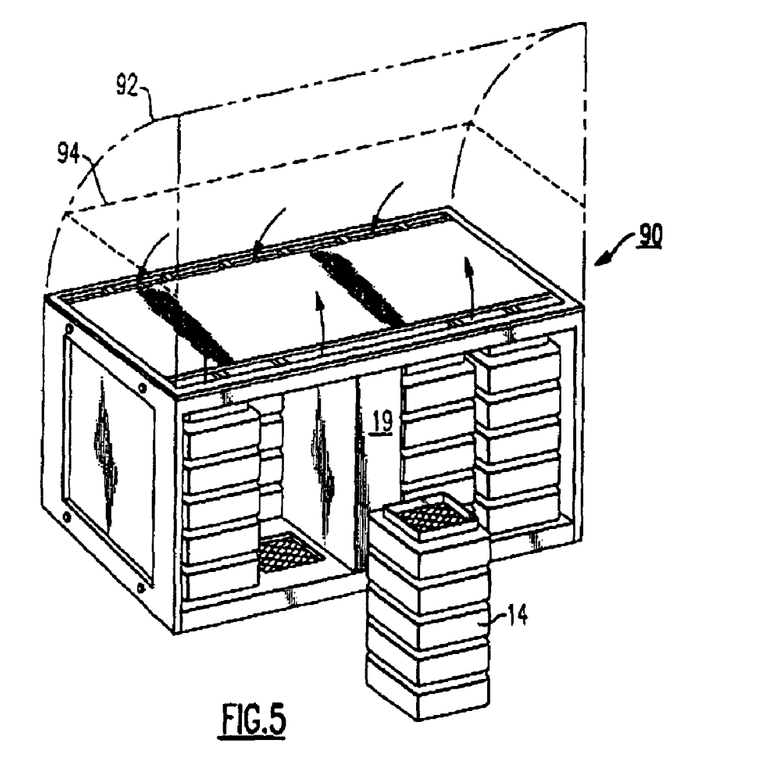
FIG. 5 is a perspective view which illustrates a work table having a partial or full hood with air flow at the front or back of the table.
Figure 6:
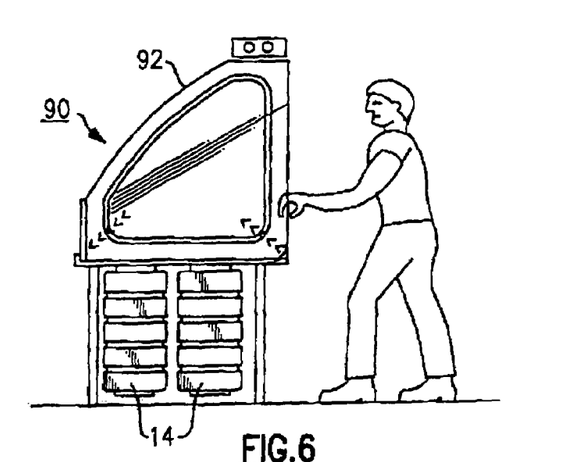
FIG. 6 is a side view of the table illustrated in FIG. 5.

Work Table Configurations. CAM8 with top work surface—VOC air is drawn in around partial or perimeter of the table, and remediated in CAM underneath, and discharged at ends or bottom of the table 80 as illustrated by the arrows in FIG. 4. Heavier-than-air VOC is collected as it spreads out and drops down from table top surface past the perimeter intake. FIGS. 5 and 6 illustrate a work table 90 with partial or full hood, 94 and 92 respectively. The partial hood has 3 shorter side walls and the full hood has three taller sidewalls plus a top over the table. VOC air is drawn in at the back of the table, remediated in CAM, and exhausted and recirculated at the front of the table forming a closed loop.

Figure 7:
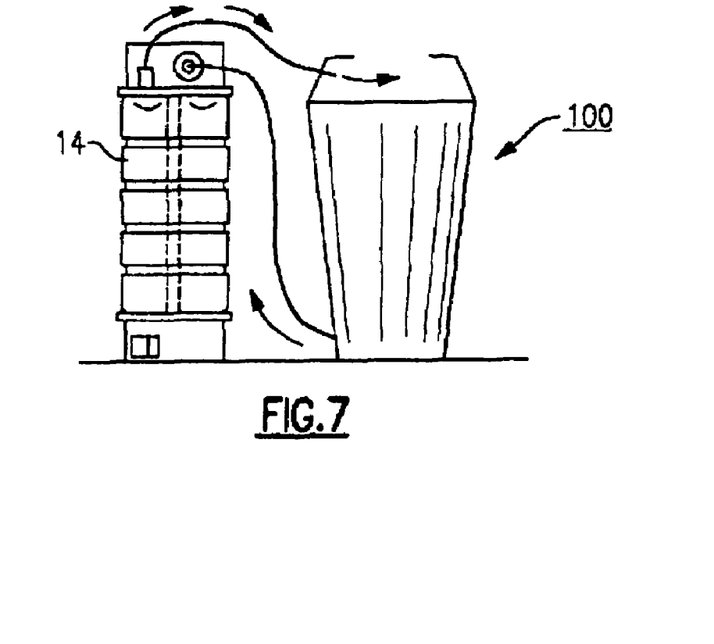
FIG. 7 is a side view of a receptacle being remediated by a cartridge of the present invention.
Figure 8:
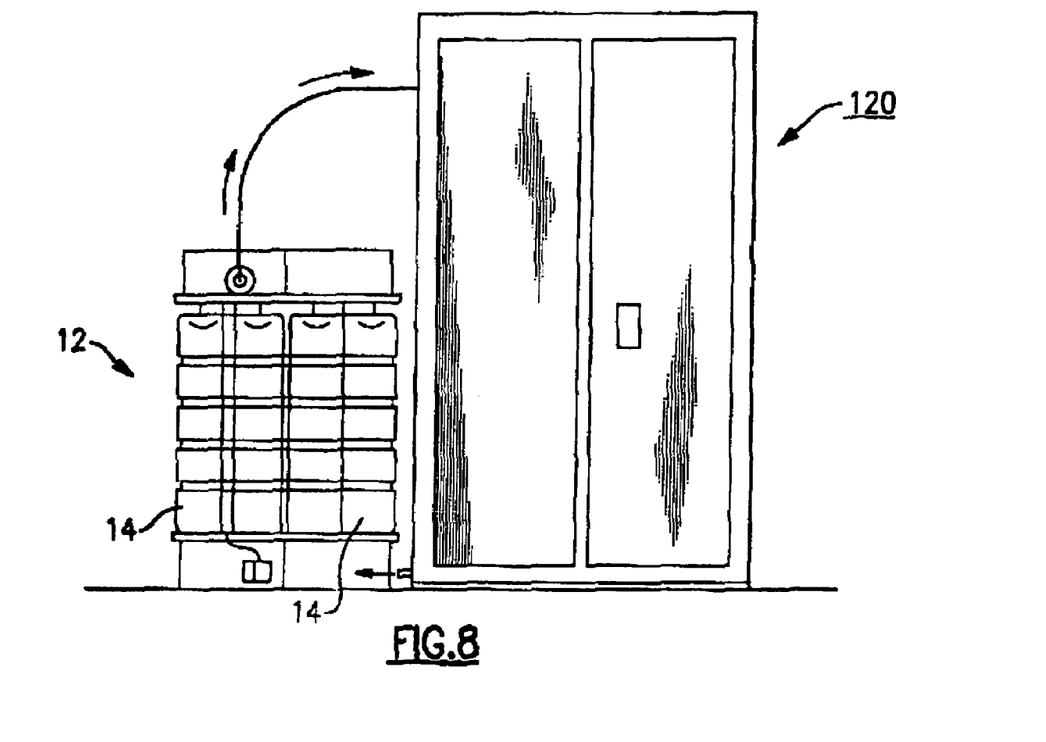
FIG. 8 is a side view of a cabinet being remediated by a cartridge of the present invention.

Cabinet Configurations. FIG. 7 illustrates VOC air drawn from the bottom of the receptacle, remediated in adjacent CAM1 or 2, and recirculated under and across the top lid next to the trash opening on top of the container 100 to make an air curtain across the trash opening. FIG. 8 illustrates heavier-than-air VOC drawn out from the bottom of a cabinet 120, remediated in an adjacent CAM, and recirculated back into the top of the cabinet. The inlet and outlet can be reversed for VOC's lighter-than air.

Figure 9:
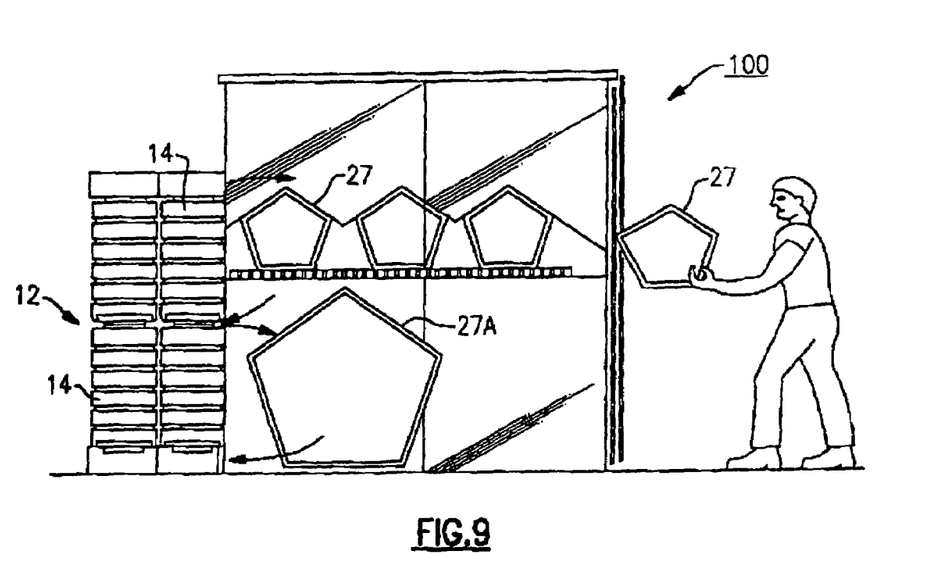
FIG. 9 is a side view of an enclosure which contains VOC generating parts which are being remediated by a cartridge containing module of the present invention.

Enclosure. FIG. 9 illustrates a temporary or permanent large, lightweight enclosure 100 for containing VOC generated from parts within the enclosure. VOC drawn out from bottom of enclosure is remediated in adjacent multiple CAMs, and recirculated back into top of the enclosure (see arrows). The enclosure can be clear flexible plastic material with a strip curtain, drape, etc. for entry/exit and placing/removing parts 27 and 27A.

Figure 10A:
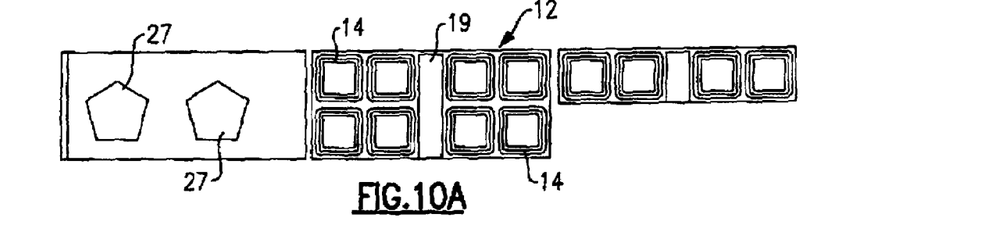
FIGS. 10A and 10B are top and side views respectively of walls or structural barriers made up of modules of the present invention.
Figure 10B:
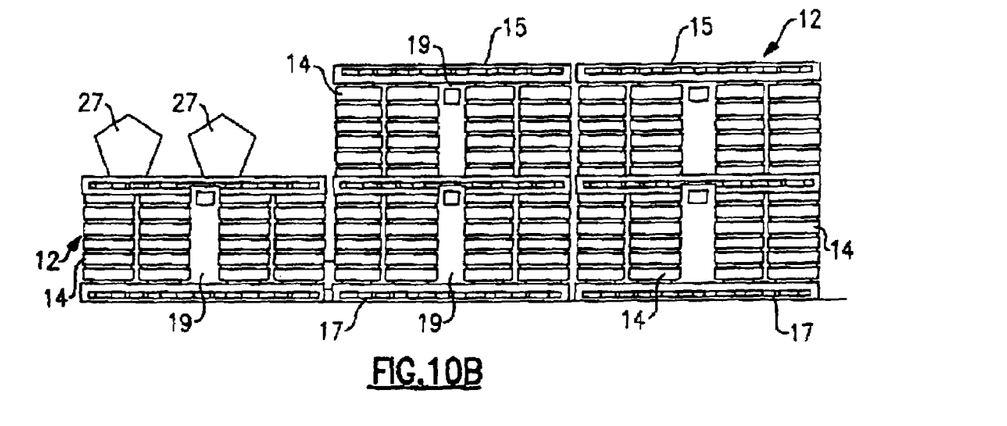

Wall Configurations. FIGS. 10A and 10B illustrate freestanding architectural air barriers placed in line(s) to contain VOC air within a defined floor area. Walls can be made up of multiple inline and/or stacked CAM units, and act as "windbreaks" for ambient airflow such as from heaters, etc. Intakes and exhausts can be on the same or opposite sides of the walls. FIG. 10A illustrates a top view and FIG. 10B a side view of single height and double height CAMs 12 placed inline end-to-end to form a wall plus a storage/work surface. Walls and demi-walls would typically employ two cartridges front to back, and multiples of four cartridges in line. Other configurations include one cartridge deep multiple CAM's, typically 4-6 cartridges, long lining building walls, and may be stacked two or more cartridges high. Intake is at the bottom and exhaust (not shown) is at the top of each CAM on the same face.

Figure 11:
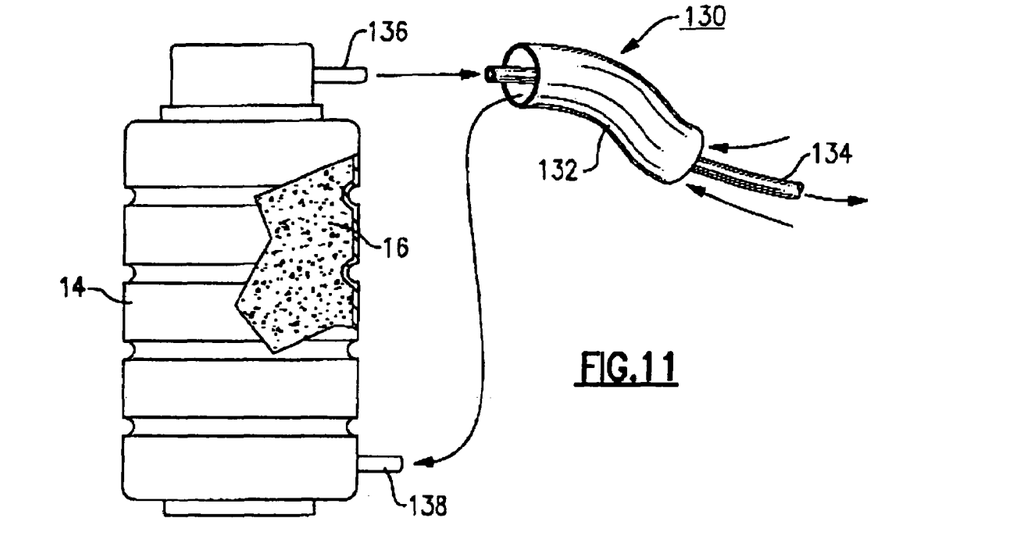
FIG. 11 is a side view illustrating the use of a coax cable or hose used in conjunction with a cartridge of the present invention.

Coax Pickup/Discharge Hose. FIG. 11 illustrates a coaxial hose 130 which comprises flexible tubes 132 and 134 placed adjacent to a source point, with the outer tube 132 collecting the VOC from the source for delivery to the inlet 138 of the CAM with the inner tube 134 delivering the remediated exhaust from outlet 136 from a CAM to a source point. Pickup/discharge functions may be reversed as required by the source point.

Figure 12:
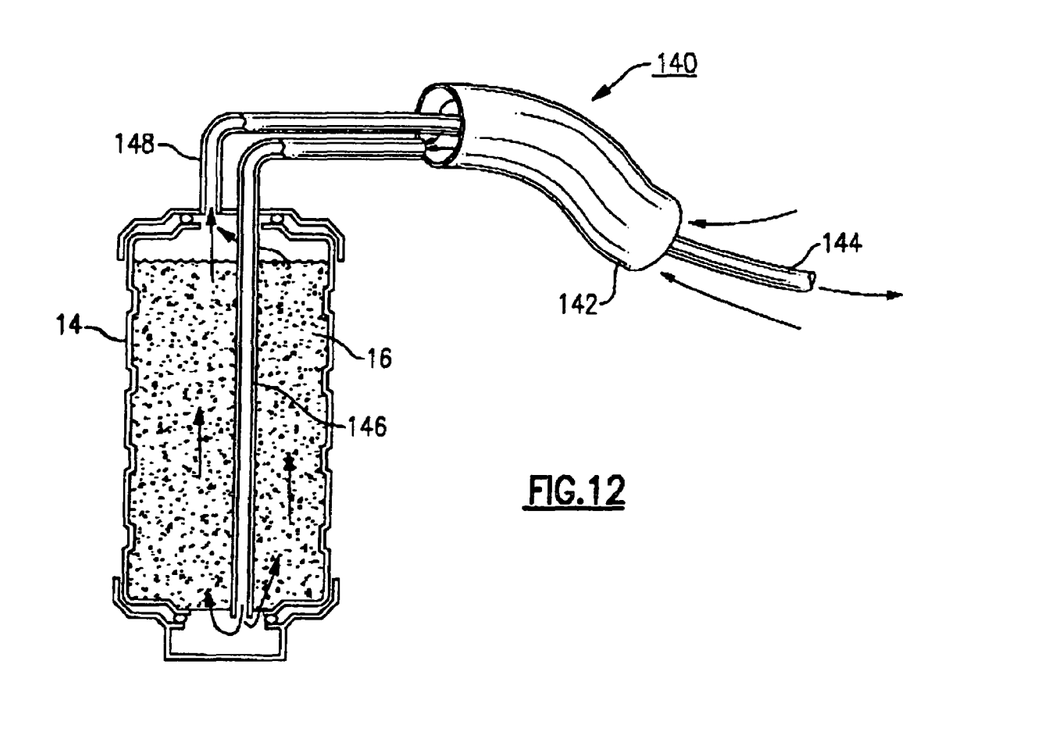
FIG. 12 is a side view illustrating a second embodiment using a coax cable or hose.

FIG. 12 illustrates the coaxial concept 140 in which the inlet VOC source 142 is delivered downward through a central tube 146 and remediated upwardly through the cartridge media 16 through outlet tube 148.

It should be understood that the present invention is not to be limited by the preferred embodiments of the mini-cartridge, which may be increased in size up to a maximum weight and volume that can be put on a pallet, moved by a factory pallet jack or fork lift, and shipped by common carrier. This is as opposed to current large permanent single reactor designs requiring a pit or rigging to install.

While the present invention has been particularly shown and described with reference to the preferred mode as illustrated in the drawings, it will be understood by one skilled in the art that various changes in detail and configuration may be effected therein without departing from the spirit and scope of the invention as defined by the claims.

I claim:

1. A system which remediates pollutants and toxins on site which comprises:
   (a) a source which generates HAP's and/or VOC's;
   (b) an air ducting system adjacent said source which captures said HAP/VOC's;

(c) at least one self-contained removable biofilter cartridge positioned adjacent said source, wherein said cartridge contains selected microorganisms which function to degrade said HAP/VOC's; and wherein said cartridge comprises an outer housing having a pair of oppositely disposed open ends, said cartridge being further positioned by insertion between a closure member which contains an exhaust port positioned at one end of said housing, and a second closure member in the form of a water reservoir positioned at said opposite end of said housing with said reservoir further containing an inlet for a source of air to be treated, with said inlet and said exhaust port being connected to said ducting system, with said closure members including means to hold and seal said cartridges in place, and circulation means positioned to promote the flow of air through said system; and (d) where in operation, captured HAP/VOC's are transported to and through said air ducting system and cartridge which recirculates remediated air back to said source point of the pollutants, and where when a given cartridge is spent or damaged from use, it may be readily removed from the system and a new cartridge inserted in its place.

2. The system of claim 1 in which the cartridges are contained in modules in single and multiple widths and depths corresponding to the number of individual cartridges placed side-by-side and front-to-back.

3. The system of claim 2 in which the module contains multiple stacked and removable cartridges.

4. The system of claim 2 in which the module contains removable inter-cartridge locating/sealing spacers.

5. The system of claim 2 in which the module contains reversible cartridges with end-to-end symmetry for inverting said cartridges in the said module.

6. The system of claim 1 in which a plurality of cartridges are contained in stacked modules in predetermined heights corresponding with the cartridge heights.

7. The system of claim 6 in which the modules include associated top and bottom manifold assemblies, control housings, and end walls.

8. The system of claim 7 in which the lower manifold assembly contains an integral reservoir, water and air passages and seals for removable cartridges.

9. The system of claim 7 in which the upper manifold assembly includes integral water discharge openings and air passages and seals for removable cartridges.

10. The system of claim 1 in which the cartridges are arranged in multiple side-by-side stacks to form a wall or partial wall.

11. The system of claim 1 in which a coaxial hose is used to transport air through said system.

12. A system which includes a plurality of interconnected self contained, removable, mini-reactor cartridges suitable for use in treating air containing HAP's and/or VOC's each of which comprises an outer housing having a pair of oppositely disposed open ends, a source of microorganism which are capable of biodegrading HAP/VOC's contained within said housings, with each of said cartridges being removeably inserted between a first closure member which contains an exhaust means and an exhaust port positioned at one end of said housing, and a second closure in the form of a water reservoir positioned at said opposite end of said housing, with said reservoir further containing an inlets for a source of air to be treated, where in operation, air to be treated is passed through said inlets and passed through a suitable source said microorganisms contained in said housings which degrade the said HAP's and VOC's of interest, with said treated air being released through said exhaust ports, and where said two closure members include means to hold and seal said cartridges in place during use.

13. The system of claim 12 in which the cartridges are contained in modules in single and multiple widths and depths corresponding to the number of individual cartridges placed side-by-side and front-to-back.

14. The system of claim 13 in which the module contains multiple stacked and removable cartridges.

15. The system of claim 14 in the module contains removable inter-cartridge locating/sealing spacers.

16. The system of claim 12 in which a plurality of cartridges are contained in stacked modules in predetermined heights corresponding with the cartridge heights.

17. The system of claim 12 in which the modules include associated top and bottom manifold assemblies, control housings, and end walls.

18. The system of claim 17 in which the upper manifold assembly includes integra; water discharge openings and air passages and seals for removable cartridges.

19. The system of claim 12 in which the lower manifold assembly contains an integral reservoir, water and air passages and seals for removable cartridges.

20. The system of claim 12 in which the module contains reversible cartridges with end-to-end symmetry for inverting said cartridges in said module.

21. The system of claim 12 in which the cartridges are arranged in multiple side-by-side stacks to form a wall or partial wall.

22. The system of claim 12 in which a coaxial hose is used to transport air through said system.

* * * * *